(12) United States Patent
Ko et al.

(10) Patent No.: US 9,185,029 B2
(45) Date of Patent: Nov. 10, 2015

(54) APPARATUS AND METHOD FOR PROCESSING PATH MANAGEMENT PACKET

(71) Applicant: Electronics and Telecommunications Research Institute, Daejeon (KR)

(72) Inventors: Jeong Gil Ko, Daejeon (KR); Jong Soo Jeong, Daejeon (KR); Jong Jun Park, Daegu (KR); Jong Arm Jun, Daejeon (KR); Nae Soo Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 117 days.

(21) Appl. No.: 13/970,250

(22) Filed: Aug. 19, 2013

(65) Prior Publication Data

US 2014/0050219 A1 Feb. 20, 2014

(30) Foreign Application Priority Data

Aug. 17, 2012 (KR) .......................... 10-2012-0089932
Nov. 23, 2012 (KR) .......................... 10-2012-0133917

(51) Int. Cl.
*H04L 1/00* (2006.01)
*H04L 12/741* (2013.01)

(52) U.S. Cl.
CPC ...................................... *H04L 45/54* (2013.01)

(58) Field of Classification Search
CPC ......... H04L 65/00; H04L 65/01; H04L 65/02; H04L 65/03; H04W 80/04; H04W 80/05; H04W 80/06; H04W 80/07; H04W 80/08
USPC .................. 370/292, 351, 328, 338, 401, 466
See application file for complete search history.

(56) References Cited

U.S. PATENT DOCUMENTS

| | | | |
|---|---|---|---|
| 7,778,235 B2 | 8/2010 | Thubert et al. | |
| 7,860,025 B2 | 12/2010 | Thubert et al. | |
| 2007/0153764 A1* | 7/2007 | Thubert et al. | 370/351 |

* cited by examiner

*Primary Examiner* — Dady Chery
(74) *Attorney, Agent, or Firm* — Rabin & Berdo, P.C.

(57) ABSTRACT

An apparatus and method for processing a path management packet is provided, the method including determining whether a router for processing a received path management packet is a storing node, and when the router is determined to be a storing node, controlling the path management packet to be stored in a routing table, or when the router is determined to be a non-storing node, failing to store the path management packet in the routing table and controlling the path management packet to be transmitted to a subsequent node.

16 Claims, 5 Drawing Sheets

APPARATUS AND METHOD FOR PROCESSING PATH MANAGEMENT PACKET

CROSS-REFERENCE TO RELATED APPLICATIONS

This application claims the priority benefit of Korean Patent Application No. 10-2012-0089932, filed on Aug. 17, 2012, and Korean Patent Application No. 10-2012-0133917, filed on Nov. 23, 2012, in the Korean Intellectual Property Office, the disclosures of which are incorporated herein by reference.

BACKGROUND

1. Field of the Invention

The present invention relates to an apparatus and method for processing a path management packet.

2. Description of the Related Art

In recent times, research into a wireless ad-hoc network using a low power device is being conducted in earnest. A representative application of the wireless ad-hoc network using the low power device may include a wireless sensor network, a smart energy service, and the like. Such applications may perform regular collection, from a device, of a sensing value and an amount of power consumed. A general low power wireless ad-hoc network may generally adopt a data processing scheme in a tree structure in order to collect data, and use a tree routing scheme to collect and transfer data.

The tree routing scheme in a low power wireless network may be divided into a scheme in which a plurality of routers stores a routing table and transfers data using the information stored, and a source routing scheme in which a routing path is designated in a header.

The low power wireless network may fail to transfer data to a lower tree when a router using the two schemes is present in an identical single network. In general, the low power wireless network may use one of the two schemes selectively, and may not allow for interoperation of the two schemes.

In particular, two devices supporting the two schemes, respectively, may fail to communicate with one another although the two devices implement the same standard. Transitively, configuring a large network and establishing an actual environment may be difficult.

The low power wireless network may require a compatibility scheme between the two routing schemes to transmit and receive data between devices using the scheme using the routing table and the source routing scheme in configuring differing devices.

SUMMARY

According to an aspect of the present invention, there is provided an apparatus for processing a path management packet, the apparatus including a reception unit to receive a path management packet, a determination unit to determine whether a router for processing the path management packet is a storing node, a control unit to control the path management packet to be stored in a routing table when the router is determined to be a storing node, and a transmission unit to transmit the path management packet to a subsequent node.

The storing node may be a router for supporting a storing mode with respect to the path management pack.

The determination unit may determine whether a routing header is required when the router is determined to be a storing node.

The control unit may add a routing header to the path management packet when the routing header is determined to be required, and control the path management packet to which the routing header is added for transmission to a subsequent node.

The control unit may estimate the subsequent node through analyzing the routing table when the routing header is determined not to be required, and controls the path management packet to be transmitted to the estimated subsequent node.

The control unit may fail to store the path management packet in the routing table when the router is determined to be a non-storing node, and control the path management packet to be transmitted to the subsequent node.

The non-storing node may be a router for supporting a non-storing mode with respect to the path management packet.

The determination unit may determine whether the routing header is present when the router is determined to be a non-storing node.

The control unit may estimate the subsequent node through analyzing header information of the routing header when the routing header is determined to be present, and control the path management packet to be transmitted to the estimated subsequent node.

The control unit may control the path management packet to be transmitted to a parent node when the routing header is determined to be absent.

According to an aspect of the present invention, there is provided a method for processing a path management packet, the method including receiving a path management packet, determining whether a router for processing the path management packet is a storing node, controlling the path management packet to be stored in a routing table when the router is determined to be a storing node, and transmitting the path management packet to a subsequent node.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
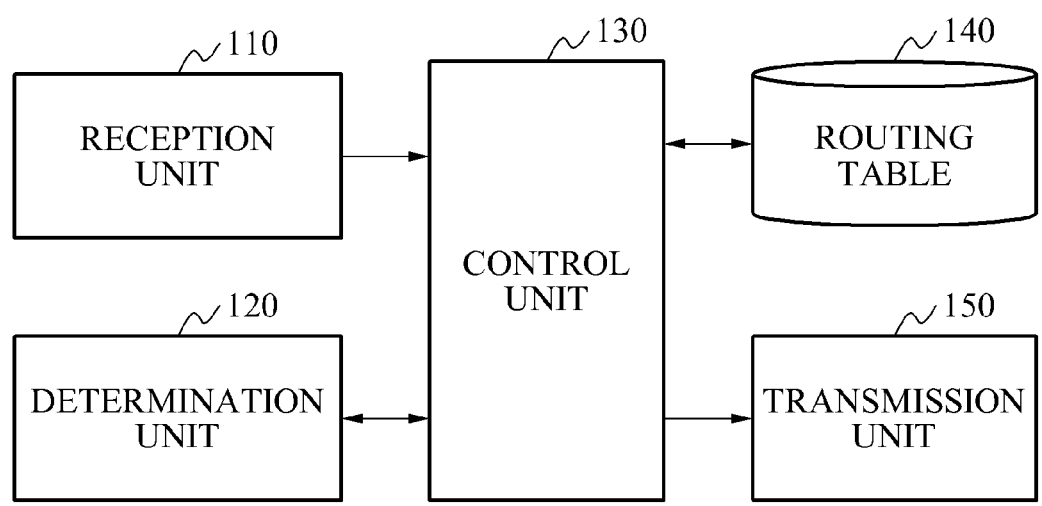
FIG. 1 is a block diagram illustrating a configuration of an apparatus for processing a path management packet according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a block diagram illustrating a configuration of an apparatus for processing a path management packet according to an embodiment of the present invention.

Referring to FIG. 1, the apparatus for processing the path management packet may include a reception unit 110 to receive a path management packet, a determination unit 120 to determine whether a router for processing the path management packet is a storing node, a control unit 130 to control the path control packet to be stored in a routing table 140 when the router is determined to be a storing unit, and a transmission unit 150 to transmit the path management packet to a subsequent node.

The storing node may correspond to a router supporting a storing mode with respect to the path management packet. The non-storing node may correspond to a router supporting a non-storing mode with respect to the path management packet.

The determination unit 120 may determine whether a routing header is required when the router is determined to be a storing node. Here, the control unit 130 may add a routing header to the path management packet when the routing header is determined to be required, and control the path management packet to which the routing header is added for transmission to a subsequent node. Also, the control unit 130 may estimate the subsequent node through analyzing the routing table when the routing header is determined not to be required, and control the path management packet to be transmitted to the estimated subsequent node.

The control unit 130 may fail to store the path management packet in the routing table 140 when the router is determined to be a non-storing node, and control the path management packet to be transmitted to the subsequent node.

The determination unit 120 may determine whether the routing header is present when the router is a non-storing node. Here, the control unit 130 may estimate the subsequent node through analyzing header information of the routing header when the routing header is determined to be present, and control the path management packet to be transmitted to the estimated subsequent node. Also, the control unit 130 may control the path management packet to a parent node when the routing header is determined to be absent.

A method for processing a path management packet may provide a compatibility scheme between a router supporting a storing mode that transfers data through storing a routing table and a router for supporting a non-storing mode, using a source routing in a low power wireless ad-hoc network based on a tree structure.

For example, the low power wireless ad-hoc network based on the tree structure may include an Internet Engineering Task Force (IETF) Low power Wireless Personal Area Networks (6LoWPAN) network based on IEEE 802.15.4 most representatively, and the IETF may suggest, as a standard, a routing protocol for low power and lossy networks (RPL) routing scheme for the low power wireless ad-hoc network, based on the tree structure, such as 6LoWPAN.

The apparatus for processing the path management packet may selectively use a storing node that stores the received path management packet in the routing table and transfers data using the path management packet stored, and a non-storing node transferring a data to an RPL root in which an uppermost node designates a total of paths in a source routing header.

The apparatus for processing the path management packet may transmit and receive data between differing routers in which the storing node and the non-storing node are mixed, and provide a compatibility between the routing scheme based on the table and the source routing scheme.

Figure 2:
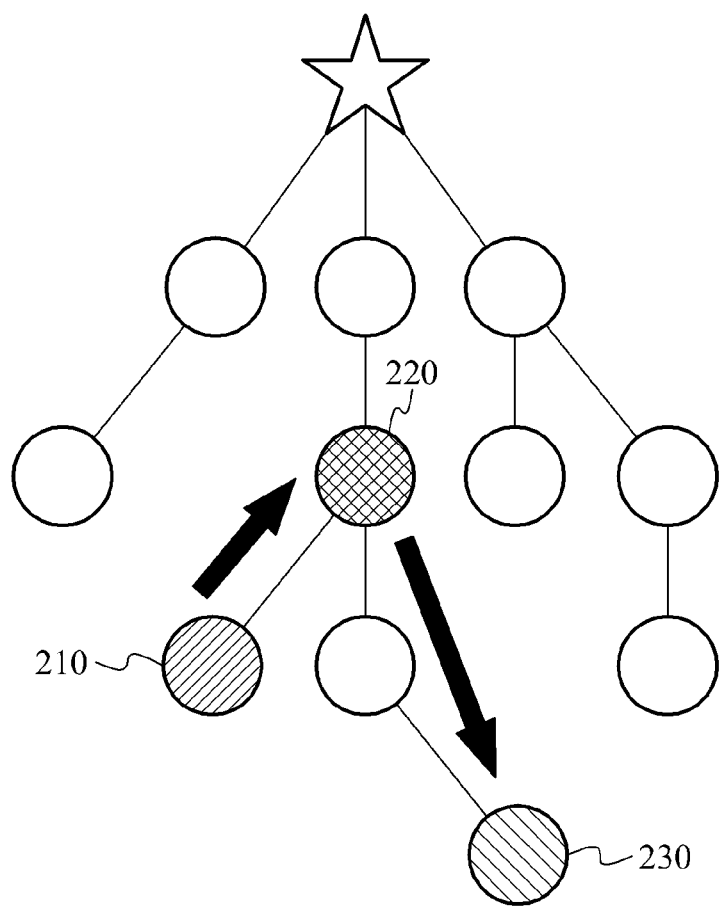
FIG. 2 is a diagram illustrating a scheme for transferring data downward through a storing mode.

FIG. 2 is a diagram illustrating a scheme for transferring data downward through a storing mode.

Referring to FIG. 2, a plurality of nodes in a storing mode may transfer a path management packet to a parent node when connecting to a network, and the parent node may store a path on a routing table of the parent node, and the parent node may re-transfer the path management packet to a parent node of the parent node. The path management packet in the storing mode may be transferred to an uppermost node of a tree by repeating the aforementioned process.

Router nodes in the storing mode may store, in a routing table, information of a node included in a sub-tree of the total of router nodes. The routing table may fail to store a total of path information, and store only a destination node of the sub-tree of the routing table and an address of a child node, for example, a next hop of a direction of a corresponding node.

A data transfer node 210 in the storing mode may transfer data to a parent node 220 of the data transfer node 210 when a destination node 230 is absent in the routing table of the data transfer node 210. Such a process may be repeated until the data is transferred to a parent node common to the data transfer node 210 and the destination node 230, in this instance, the parent node 220. The common parent node 220 of the data transfer node 210 and the destination node 230 may have information about the destination node 230 on the routing table of the common parent node 220, and transfer the data to a corresponding child node.

Figure 3:
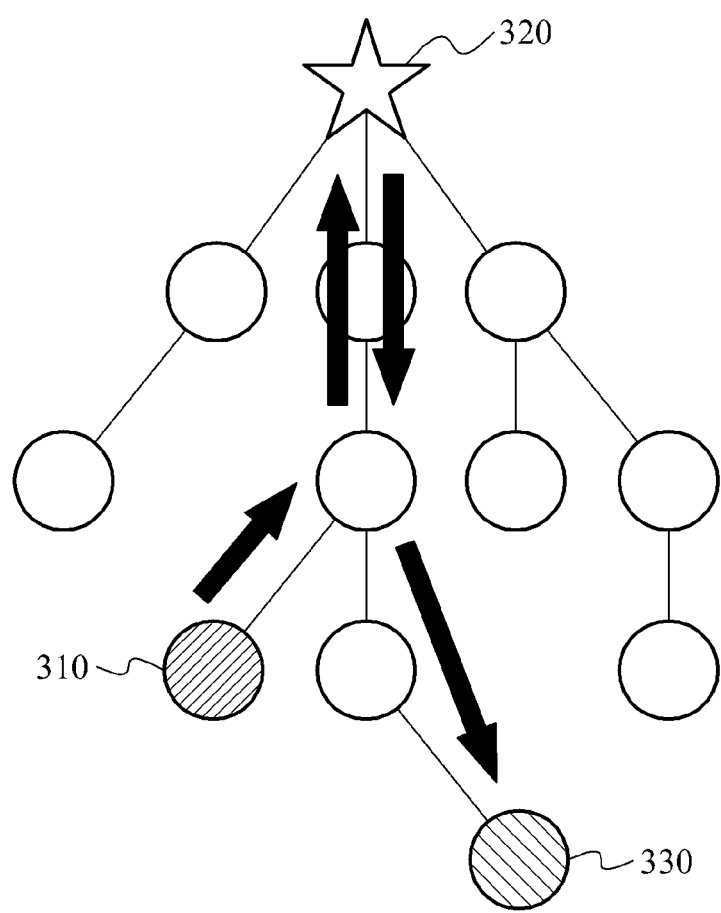
FIG. 3 is a diagram illustrating a scheme for transferring data downward through a non-storing mode.

FIG. 3 is a diagram illustrating a scheme for transferring data downward through a non-storing mode.

Referring to FIG. 3, a plurality of nodes in a non-storing mode may transfer a path management packet to a parent node when connecting to a network. Here, the path management packet in the non-storing mode may include an address of a parent node of the path management packet.

A non-storing node may transfer a corresponding packet directly to an uppermost node in a data transfer node 310 because the non-storing node may fail to store a routing table, and an uppermost node 320 may store a routing path of all nodes connected to the network.

Data in the non-storing mode may be transferred to the uppermost node 320, and the uppermost node 320 may search for a destination node 330 of the data in a path table of the uppermost node 320, and transfer the data via a corresponding path through adding, to a source routing header, a total of routing paths leading to the destination node 330. A router receiving a packet including the source routing header may transfer the data to the final destination node 330, using a path described in a header.

Hereinafter, a method for processing a path management packet according to an exemplary embodiment will be described.

Figure 4:
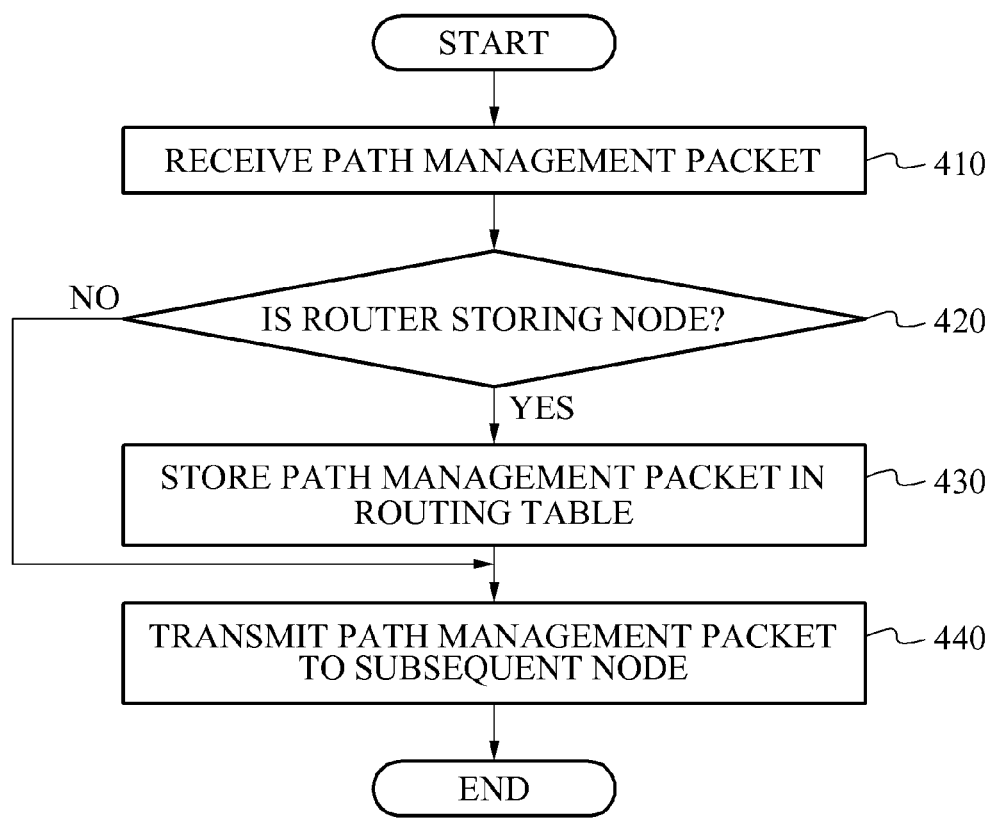
FIG. 4 is a flowchart illustrating a method for processing a path management packet according to an embodiment of the present invention.

FIG. 4 is a flowchart illustrating a method for processing a path management packet according to an embodiment of the present invention.

An apparatus for processing a path management packet may receive a path management packet in operation 410, and determine whether a router for processing the path management packet is a storing node in operation 420.

When the router is determined to be a storing node, the apparatus for processing the path management packet may control the path management packet to be stored in a routing table in operation 430, and transmit the path management packet to a subsequent node in operation 440.

When the router is determined to be a non-storing node, the apparatus for processing the path management packet may fail to store the path management packet in the routing table, and control the path management packet to be transmitted to the subsequent node.

For example, when the router is determined to be a storing node, the apparatus for processing the path management packet may store path information of the received path management packet in a routing table of the apparatus for processing the path management packet to transfer the path information to a parent node. Conversely, when the router is determined to be a non-storing node, the apparatus for processing the path management packet may transfer a corresponding packet to a parent node of the apparatus for processing the path management packet directly.

Figure 5:
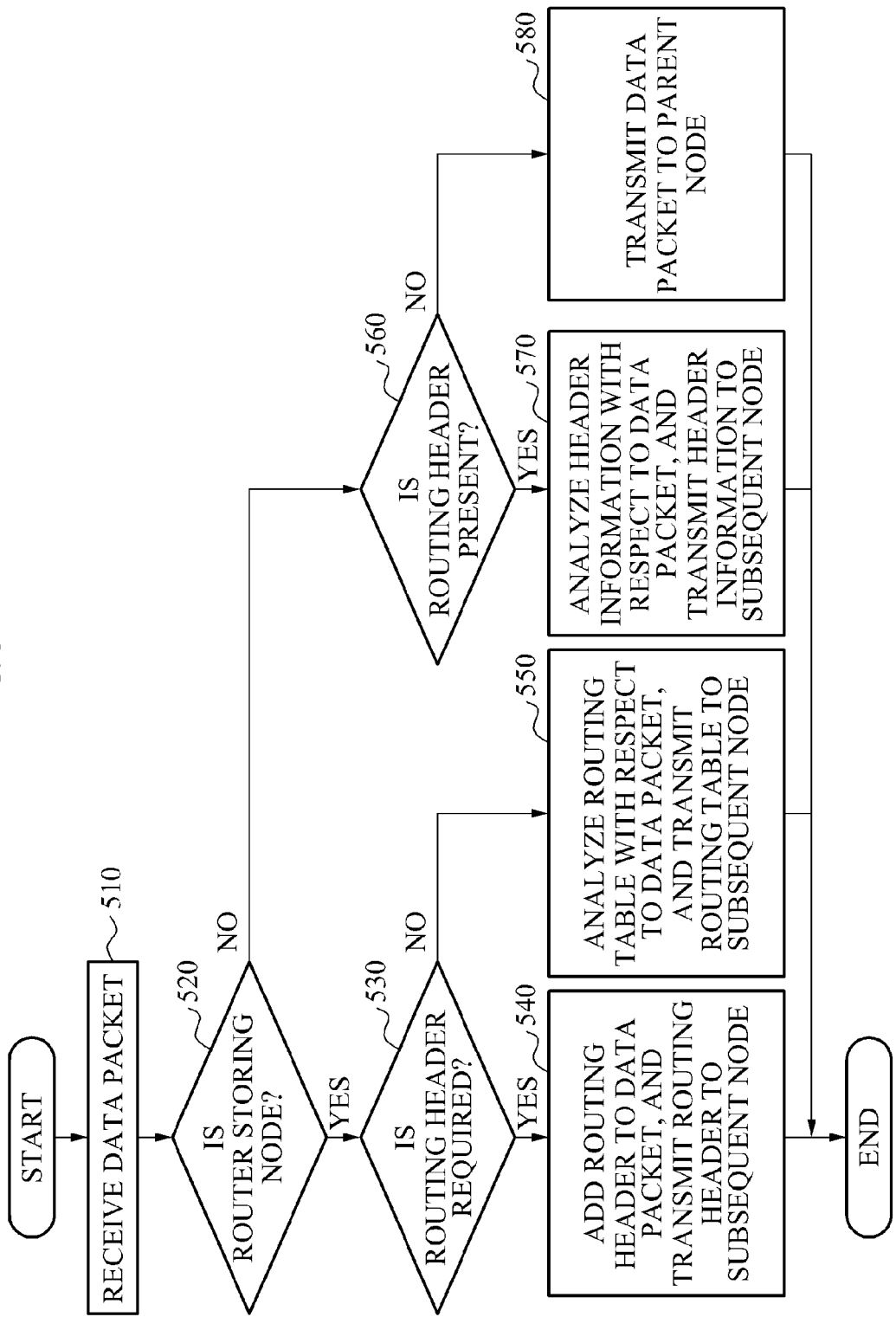
FIG. 5 is a flowchart illustrating a detailed method for processing a path management packet according to an embodiment of the present invention.

FIG. 5 is a flowchart illustrating a detailed method for processing a path management packet according to an embodiment of the present invention.

Referring to FIG. 5, the apparatus for processing the path management packet may receive a data packet in operation 510, determine whether a router is a storing node in operation 520, and when the router is determined to be a storing node, determine whether a routing header is required.

For example, a plurality of routers may determine whether the router is a storing node when receiving a data packet, and when the router is determined to be a storing node, may verify whether a data destination is stored in a routing table of the router, and when the data destination is verified to be absent in the routing table, may transfer a path management packet to a parent node. In operation 530, the plurality of routers may determine whether a routing header is required when a destination is present in the routing table of the router.

In operation 540, when the routing header is determined to be required, the apparatus for processing the path management packet may add the routing header to the data packet, and control the data packet to which the routing header is added for transmission to a subsequent node.

In operation 550, when the routing header is determined not to be required, the apparatus for processing the path management packet may estimate the subsequent node through analyzing the routing table, and control the data pack to be transmitted to the estimated subsequent node.

For example, the apparatus for processing the path management packet may add a source routing header to a data packet, and transfer, to a subsequent node, the data packet to which the source routing header is added when a child node of a verified routing path fails to be a storing node.

Here, the source routing header may store a path to a subsequent storing node present in a path or a path to a final destination node, and a total of storing nodes present in a path from a storing node that receives a packet to a destination node may store a path of a destination node in a routing table of the total of storing nodes.

In particular, a source routing header for transferring data may be reconfigured in a corresponding storing node, and when generating a source routing header, the storing node may store a routing path to a subsequent storing node on a path, and selectively store a subsequent path.

The storing node may search for path information by searching for a total of routing tables of the storing node, search for the path information required for transferring data to a lower level tree from a routing table with respect to a sub-tree of the storing node as an uppermost node of a non-storing mode searches for path information required for transferring data to a lower level tree, and add the path information to a source routing header.

The storing node may fail to add the source routing header to a data packet, and transfer a packet to a node of the routing table when the storing node is a child node of the routing path found.

Also, the apparatus for processing the path management packet may determine whether the routing header is present when the router is a non-storing node in operation 560. Here, when the routing header is present, the apparatus for processing the path management packet may analyze header information of the routing header and estimate the subsequent node in operation 570, and control the data packet to be transmitted to the estimated subsequent node in operation 580.

In operation 511, the apparatus for processing the path management packet may control the path management packet to be transmitted to a parent node when the routing header is absent.

An aspect of the present invention provides a low power ad-hoc network using a tree structure that provides a routing compatibility between a routing scheme using a routing table and a source routing scheme.

Another aspect of the present invention also provides an enhancement in a standard low power tree based network configuration, and an expansion in a coverage of a network application.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus for processing a path management packet, the apparatus comprising:
a reception unit configured to receive a path management packet;
a determination unit configured to determine whether a router for processing the path management packet is a storing node or a non-storing node;
a control unit configured to
control to store the path management packet in a routing table before transmitting the path management packet to a subsequent node when the router is determined to be a storing node, control to transmit the path management packet to the subsequent node without storing the path management packet in a routing table, when the router is determined to be a non-storing node, and add a routing header to the path management packet when the routing header is determined to be required, and control the path management packet to which the routing header is added for transmission to the subsequent node; and a transmission unit configured to transmit the path management packet to the subsequent node.

2. The apparatus of claim 1, wherein the storing node is a router that supports a storing mode with respect to the path management pack.

3. The apparatus of claim 1, wherein the determination unit determines whether a routing header is required when the router is determined to be a storing node.

4. The apparatus of claim 3, wherein the control unit estimates the subsequent node through analyzing the routing table when the routing header is determined not to be required, and controls the path management packet to be transmitted to the estimated subsequent node.

5. The apparatus of claim 1, wherein the non-storing node is a router that supports a non-storing mode with respect to the path management packet.

6. The apparatus of claim 1, wherein the determination unit determines whether the routing header is present when the router is determined to be a non-storing node.

7. The apparatus of claim 6, wherein the control unit estimates the subsequent node through analyzing header information of the routing header when the routing header is determined to be present, and controls the path management packet to be transmitted to the estimated subsequent node.

8. The apparatus of claim 6, wherein the control unit controls the path management packet to be transmitted to a parent node when the routing header is determined to be absent.

9. A method for processing a path management packet, the method comprising:

receiving a path management packet;

determining whether a router for processing the path management packet is a storing node or a non-storing node;

controlling the path management packet to be stored in a routing table and transmitting the path management packet to a subsequent node, when the router is determined to be a storing node;

controlling to transmit the path management packet to the subsequent node without storing the path management packet in a routing table, when the router is determined to be a non-storing node;

adding a routing header to the path management packet when the routing header is determined to be required; and controlling the path management packet to which the routing header is added for transmission to the subsequent node.

10. The method of claim 9, wherein the storing node is a router that supports a storing mode with respect to the path management packet.

11. The method of claim 9, further comprising:

determining whether a routing header is required when the router is determined to be a storing node.

12. The method of claim 11, further comprising:

estimating the subsequent node through analyzing the routing table when the routing header is determined not to be required; and controlling the path management packet to be transmitted to the estimated subsequent node.

13. The method of claim 9, wherein the non-storing node is a router that supports a non-storing mode with respect to the path management packet.

14. The method of claim 9, further comprising:

determining whether a routing header is present when the router is determined to be a non-storing node.

15. The method of claim 14, further comprising:

estimating the subsequent node through analyzing header information of the routing header when the routing header is determined to be present; and controlling the path management packet to be transmitted to the estimated subsequent node.

16. The method of claim 14, further comprising:

controlling the path management packet to be transmitted to a parent node when the routing header is determined to be absent.

* * * * *